3,775,507
PROCESS FOR REMOVING CARBON DIOXIDE FROM ACETYLENE
Gerd Duembgen, Dannstadt, and Rolf Platz, Mannheim, Germany, assignors to Badische Anilin- & Soda-Fabrik Aktiengesellschaft, Ludwigshafen am Rhine, Germany
No Drawing. Filed Mar. 27, 1972, Ser. No. 238,652
Claims priority, application Germany, Apr. 5, 1971, P 21 16 557.1
Int. Cl. C07c 11/24
U.S. Cl. 260—679 A        5 Claims

ABSTRACT OF THE DISCLOSURE

A process for removing residual amounts of carbon dioxide from pure acetylene (which has been obtained by thermal cracking of hydrocarbons after a main washing of the cracked gas with diethanolamine for removal of the major portion of $CO_2$ and separation of the other components of the cracked gas) which comprises first giving the pure acetylene a preliminary wash with the regenerated diethanolamine solution from the main $CO_2$ wash, then further washing it with a fresh diethanolamine solution serving to replenish the wash solution of the main $CO_2$ wash, combining the two wash solutions and resupplying them to the main $CO_2$ wash cycle.

---

It is known that cracked gas containing acetylene and ethylene produced by means of a submerged flame in the thermal cracking of hydrocarbons, for example crude oil, can be treated with an aqueous solution of diethanolamine in a regenerative wash to remove the major portion of the carbon dioxide. It is also known that, following the main carbon dioxide wash, carbon monoxide, hydrogen and methane can be separated by low temperature treatment and $C_3$ and higher hydrocarbons can be separated by washing with toluene. It has been found that there is a residual amount of carbon dioxide contained in the remaining $C_2$ hydrocarbon gas and that in the separation of acetylene from the $C_2$ hydrocarbon gas with a selective solvent the residual amount of carbon dioxide is contained partly or wholly in the otherwise pure acetylene according to the nature of the wash. This content of carbon dioxide in the pure acetylene is undesirable however for various applications.

We have now found that the said residual amount of carbon dioxide can be removed in a simple way from the cracked gas obtained by thermal cracking of hydrocarbons after the main wash of the cracked gas by means of diethanolamine for the removal of the major portion of carbon dioxide and the separation of the other components of the cracked gas, by first giving the pure acetylene a preliminary wash with the regenerated diethanolamine solution from the main carbon dioxide wash and then washing it with a fresh diethanolamine solution serving to replenish the wash solution of the main carbon dioxide wash, combining the two wash solution and returning them to the main carbon dioxide washing cycle.

This process has the advantage that no additional solvent is required and the amount of diethanolamine required in the main wash cycle is utilized in the afterwash. Moreover there is no need for the regeneration which is necessary when another solvent is used because both the loaded regenerated diethanolamine solution and the pure solution combined are supplied to the main wash cycle. A particularly advantageous embodiment of the process consists in carrying out the fine purification of the acetylene in a single tower, for example in a bubble tray column, into which the acetylene to be purified is fed at the bottom, the regenerated diethanolamine solution at about the middle and the pure solution at the top. It has been found, surprisingly, that the higher hydrocarbons contained in the regenerated diethanolamine solution do not contaminate the acetylene.

The process of the invention may be used with particular advantage for removing residual amounts of carbon dioxide from pure acetylene which has been separated from cracked gases obtained by the submerged flame method. The submerged flame method is described for example in U.S. Pat. 2,985,695.

The removal of carbon dioxide from hydrocarbons by means of diethanolamine solution is known per se, for example from A. Kohl and F. Riesenfeld, "Gas Purification," McGraw-Hill Book Co., 1960.

The residual amount of carbon dioxide in the pure acetylene is generally not more than 0.1% by volume, preferably not more than 0.02% by volume and particularly not more than 0.005% by volume.

The following example illustrates the invention.

EXAMPLE 2.5 liters per hour of a 25% diethanolamine solution from the main carbon dioxide wash after regeneration is introduced at 20° C. into a five tray bubble tray column and into the bottoms of the bubble tray column there is introduced 10 cubic meters of acetylene per hour with 2000 parts by volume per million of carbon dioxide. The gas leaves this five tray bubble tray column with a carbon dioxide content of 400 parts by volume per million and is then washed counter-current with 0.25 liter per hour of a 25% fresh mixture of diethanolamine and water. The carbon dioxide content at the top of the column is 16 parts by volume per million. The fresh diethanolamine solution laden with carbon dioxide is mixed with the 2.5 liters of solution.

We claim:
1. A process for the removal of a residual content of not more than about 0.1% by volume of carbon dioxide from a pure acetylene which has been obtained by the thermal cracking of hydrocarbons after the main XV of the cracked gas with diethanolamine for removal of the bulk of said carbon dioxide down to said residual content and after separation of the other components of the cracked gas, which process comprises:
   regenerating diethanolamine from said main wash and first subjecting said pure acetylene consisting essentially of acetylene and not more than 0.1% by volume of carbon dioxide to a preliminary wash with the regenerated diethanolamine;
   then further washing said pure acetylene with a fresh diethanolamine solution needed to replenish the main wash solution; and
   combining both of said diethanolamine washes and recycling them to said main wash.
2. A process as claimed in claim 1 wherein said pure acetylene after said main wash has a residual content of carbon dioxide of not more than about 0.02% by volume.
3. A process as claimed in claim 1 wherein said pure acetylene after said main wash has a residual content of carbon dioxide of not more than about 0.005% by volume.
4. A process as claimed in claim 1 wherein said pure acetylene with a residual content of not more than 0.1% by volume of carbon dioxide after said main wash is introduced into a lower portion of a wash column, the regenerated diethanolamine solution is introduced into the middle region of said column and the fresh diethanolamine solution is introduced into the top of said column, the finely purified acetylene then being withdrawn at the top of said column while the combined wash solutions are withdrawn from the bottom of said column and recycled to said main wash.

5. A process as claimed in claim 1 wherein the residual amount of carbon dioxide is removed from a pure acetylene isolated by the main wash of a cracked gas obtained by the submerged flame method.

References Cited

UNITED STATES PATENTS

| | | | |
|---|---|---|---|
| 2,477,314 | 7/1949 | Scharmann | 423—229 |
| 3,696,162 | 10/1972 | Kniel | 260—677 A |
| 3,563,696 | 6/1969 | Benson | 423—229 |
| 2,779,458 | 1/1957 | Nelson | 206—7 |
| 3,598,881 | 8/1971 | Kniel et al. | 260—677 A |
| 3,098,705 | 7/1963 | Bally | 23—3 |
| 2,487,577 | 11/1949 | Stanley | 23—3 |

FOREIGN PATENTS

| | | | |
|---|---|---|---|
| 649,359 | 9/1962 | Canada | 55—63 |

OTHER REFERENCES

Kohl and Riesenfeld: "Gas Purification," McGraw-Hill Book Co., 1960., pp. 18–24, and pp. 38–55.

DELBERT E. GANTZ, Primary Examiner

J. M. NELSON, Assistant Examiner

U.S. Cl. X.R.

55—63; 423—229

UNITED STATES PATENT OFFICE
CERTIFICATE OF CORRECTION

Patent No. 3,775,507                    Dated November 27, 1973

Inventor(s) Gerd Duembgen and Rolf Platz

It is certified that error appears in the above-identified patent and that said Letters Patent are hereby corrected as shown below:

Column 2, line 39, "XV" should read -- wash --.

Signed and sealed this 5th day of November 1974.

(SEAL)
Attest:

McCOY M. GIBSON JR.                C. MARSHALL DANN
Attesting Officer                  Commissioner of Patents